United States Patent
Keesee et al.

(10) Patent No.: US 11,642,699 B2
(45) Date of Patent: May 9, 2023

(54) VIBRATION TABLES FOR SORTING AGRICULTURAL PRODUCTS

(71) Applicants: Kellin Keesee, Wenatchee, WA (US); Barry Keesee, Wenatchee, WA (US); Kayla Keesee, Wenatchee, WA (US)

(72) Inventors: Kellin Keesee, Wenatchee, WA (US); Barry Keesee, Wenatchee, WA (US); Kayla Keesee, Wenatchee, WA (US)

( * ) Notice: Subject to any disclaimer, the term of this patent is extended or adjusted under 35 U.S.C. 154(b) by 0 days.

(21) Appl. No.: 17/535,030

(22) Filed: Nov. 24, 2021

(65) Prior Publication Data

US 2022/0080462 A1 Mar. 17, 2022

(51) Int. Cl.
| | |
|---|---|
| *B07B 13/07* | (2006.01) |
| *B07B 1/16* | (2006.01) |
| *B07B 1/00* | (2006.01) |
| *B07B 1/28* | (2006.01) |

(52) U.S. Cl.
CPC ............. *B07B 1/005* (2013.01); *B07B 1/16* (2013.01); *B07B 1/28* (2013.01); *B07B 13/07* (2013.01)

(58) Field of Classification Search
CPC .. B07B 1/005; B07B 1/16; B07B 1/28; B07B 13/07
USPC ........................................................ 209/12.1
See application file for complete search history.

(56) References Cited

U.S. PATENT DOCUMENTS

| | | | | | |
|---|---|---|---|---|---|
| 376,904 | A | * | 1/1888 | Phillips | B07B 13/07 |
| | | | | | 209/670 |
| 1,871,471 | A | * | 8/1932 | Rose | B07B 1/14 |
| | | | | | 209/628 |
| 2,782,943 | A | * | 2/1957 | Jones | A01D 46/243 |
| | | | | | 414/508 |
| 4,363,408 | A | * | 12/1982 | O'Brien | B07B 13/00 |
| | | | | | 209/558 |
| 5,887,878 | A | * | 3/1999 | Tisbo | B62B 1/20 |
| | | | | | 280/47.35 |
| 8,763,815 | B2 | * | 7/2014 | Pellenc | B07B 1/15 |
| | | | | | 209/673 |
| 8,960,458 | B1 | * | 2/2015 | Klein | A47B 87/0207 |
| | | | | | 211/186 |
| 2008/0149539 | A1 | * | 6/2008 | Burkhard | B07B 1/40 |
| | | | | | 209/327 |
| 2012/0131894 | A1 | * | 5/2012 | Pellenc | B07B 1/15 |
| | | | | | 209/673 |
| 2015/0204415 | A1 | * | 7/2015 | Bateman | B23D 47/005 |
| | | | | | 248/634 |

(Continued)

FOREIGN PATENT DOCUMENTS

CN 104620780 B * 6/2018
CN 108838075 A * 11/2018

*Primary Examiner* — Terrell H Matthews

(57) ABSTRACT

Tables for sorting agricultural producta. The tables include legs, a deck, and a vibration generator. The deck is supported on the legs. The deck includes a loading end, a terminal end, and a grate. The terminal end is opposite the loading end. The grate extends between the loading end and the terminal end and defines the grate openings. The vibration generator is mounted to the deck and configured to vibrate the deck. The grate supports agricultural products that are larger than the grate openings. Agricultural products that are smaller than the grate openings pass through the grate. The vibration generator vibrating the deck causes the agricultural products to move across the deck over the grate.

15 Claims, 7 Drawing Sheets

(56) References Cited

U.S. PATENT DOCUMENTS

2021/0267367 A1\* 9/2021 Olsson ..................... B60R 7/02

\* cited by examiner

VIBRATION TABLES FOR SORTING AGRICULTURAL PRODUCTS

BACKGROUND

The present disclosure relates generally to tables. In particular, vibration tables for sorting agricultural products are described.

Agricultural products are important drivers of national, state, and local economies. Many agricultural products must be sorted by size, shape, or other attribute. Sorting agricultural products can be time and labor intensive.

Sorting tables exist to facilitate sorting agricultural products. However, known sorting tables are not entirely satisfactory for the range of sorting applications in which they are employed.

For example, existing sorting tables require sorting agricultural products by hand and are thus make sorting agricultural products labor and time intensive. Hand sorting also requires the user to handle the agricultural product to a significant degree, which increases the risk that the product will be damaged or degraded during the sorting process. Further, existing sorting tables do not enable sorting agricultural products with sufficient consistently or accuracy.

Thus, there exists a need for sorting tables that improve upon and advance the design of known sorting tables. Examples of new and useful tables relevant to the needs existing in the field are discussed below.

SUMMARY

The present disclosure is directed to tables for sorting an agricultural product. The tables include legs, a deck, and a vibration generator. The deck is supported on the legs. The deck includes a loading end, a terminal end, and a grate. The terminal end is opposite the loading end. The grate extends between the loading end and the terminal end and defines the grate openings. The vibration generator is mounted to the deck and configured to vibrate the deck. The grate supports agricultural products that are larger than the grate openings. Agricultural products that are smaller than the grate openings pass through the grate. The vibration generator vibrating the deck causes the agricultural products to move across the deck over the grate.

DETAILED DESCRIPTION

Figure 1:
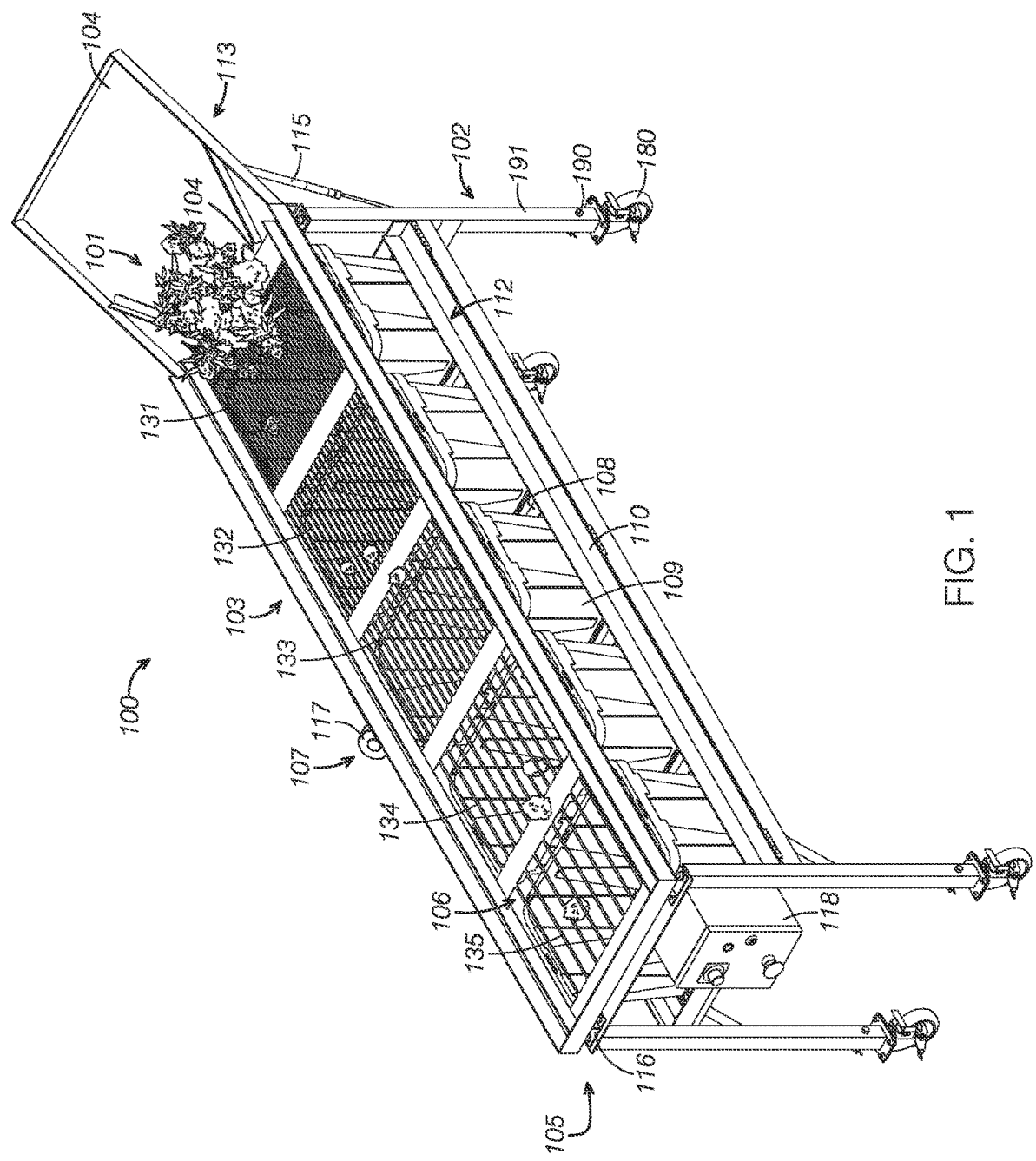
FIG. 1 is a front-top perspective view of a table for sorting agricultural products.

The disclosed tables will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various tables are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device exchanges information with another electronic device, either wirelessly or with a wire-based connector, whether directly or indirectly through a communication network.

"Controllably coupled" means that an electronic device controls operation of another electronic device.

Vibration Tables for Sorting Agricultural Products

With reference to the figures, vibration tables for sorting agricultural products will now be described. The tables discussed herein function to sort agricultural products by shape and size.

The reader will appreciate from the figures and description below that the presently disclosed tables address many of the shortcomings of conventional sorting tables. For example, the novel tables described herein reduce or eliminate the need to hand sort agricultural products, which reduces the labor and time required to sort the agricultural products. The novel tables described below reduce or eliminate the need for a user to handle the agricultural products when sorting them, which decreases the risk that the product will be damaged or degraded during the sorting process.

Further the novel sorting tables described in this document enable sorting agricultural products with significantly increased consistency and accuracy compared to conventional sorting tables.

Contextual Details

Ancillary features relevant to the tables described herein will first be described to provide context and to aid the discussion of the tables.

Agricultural Products

The tables described below are primarily used to sort agricultural products. The agricultural products may be any agricultural product that can be sorted by size and/or shape. Suitable agricultural products include crops, edible forest products, and agricultural commodities. In some examples, such as depicted in FIG. 1 on a loading end of the table, the agricultural product is cannabis. However, in other examples agricultural products other than cannabis are sorted with the tables described below.

Table Embodiment One

With reference to FIGS. 1-7, a table 100 will now be described as a first example of a table. The reader can see in FIGS. 1-7 that table 100 is for sorting a supply of agricultural products 101 by size and shape.

As shown in FIGS. 1-7, table 100 includes legs 102, a deck 103, a vibration generator 107, a shelf 108, a bin 109, a gate 110, a tray assembly 113, vibration dampeners 116, and a controller 118. In other examples, the table includes fewer components than depicted in the figures. In certain examples, the table includes additional or alternative components than depicted in the figures.

The size and shape of the table may be varied as needed for a given application. In some examples, the table is larger relative to the agricultural products than depicted in the figures. In other examples, the table is smaller relative to the agricultural products than depicted in the figures. Further, the reader should understand that the table and the other components may all be larger or smaller than described herein while maintaining their relative proportions.

Legs

Legs 102 function to support deck 103. The legs may be any currently known or later developed type of table leg. The reader will appreciate that a variety of table leg types exist and could be used in place of the legs shown in the figures. In addition to the types of table legs existing currently, it is contemplated that the tables described herein could incorporate new types of table legs developed in the future.

As shown in FIGS. 1-7, table 100 includes four legs. However, the number of legs in the table may be selected to meet the needs of a given application. The reader should appreciate that the number of legs may be different in other examples than is shown in the figures. For instance, some table examples include additional or fewer legs than described in the present example.

The size and shape of the legs may be varied as needed for a given application. In some examples, the legs are larger relative to the other components than depicted in the figures. In other examples, the legs are smaller relative to the other components than depicted in the figures. Further, the reader should understand that the legs and the other components may all be larger or smaller than described herein while maintaining their relative proportions.

Legs 102 serve to selectively adjust the height of deck 103. As shown in FIGS. 1-4, legs 102 each include an outer member 191 and an inner member 192 inside outer member 191. Outer member 191 and inner member 192 are configured to move relative to each other telescopically to selectively adjust the height of deck 103. Legs 102 include a pin 190 that selectively extends through aligned holes in outer member 191 and inner member 192 to secure outer member 191 and inner member 192 in a desired position relative to each other.

With reference to FIG. 14, all four legs 102 are height adjustable. In other examples, fewer than all the legs are height adjustable, such as one or more of legs being height adjustable. In some examples, the two legs proximate the tray assembly are height adjustable and the legs distal the tray assembly have a fixed height.

Legs 102 function to move table 100 to a desired position over the ground. As depicted in FIGS. 1-4, 6, and 7, legs 102 include casters 180. In some examples, some of the legs include castors and some of the legs do not include castors. In certain examples, none of the legs include castors.

The castors may be any currently known or later developed type of castor. The size and material of the castors may be selected to meet the needs of a given application.

In the present example, outer member 191 and inner member 192 are composed of metal. However, the legs may be composed of any currently known or later developed material suitable for the applications described herein for which it is used. Suitable materials include metals, polymers, ceramics, wood, and composite materials.

Deck

The role of deck 103 is to sort supply of agricultural products 101 by size and shape. The reader can see in FIGS. 1-4, 6, and 7 that deck 103 is supported on legs 102 and on vibration dampeners 116.

As shown in FIGS. 1-5, deck 103 includes a loading end 104, a terminal end 105, and a grate 106. The reader can see in FIGS. 1-5 that loading end 104 is proximate tray assembly 113. As depicted in FIG. 14, terminal end 105 is opposite loading end 104 distil tray assembly 113.

The deck may be any currently known or later developed type of deck. The reader will appreciate that a variety of deck types exist and could be used in place of the deck shown in the figures. In addition to the types of decks existing currently, it is contemplated that the tables described herein could incorporate new types of decks developed in the future.

In the present example, the deck is composed of metal. However, the deck may be composed of any currently known or later developed material suitable for the applications described herein for which it is used. Suitable materials include metals, polymers, ceramics, wood, and composite materials.

The size and shape of the deck may be varied as needed for a given application. In some examples, the deck is larger relative to the other components than depicted in the figures. In other examples, the deck is smaller relative to the other components than depicted in the figures. Further, the reader should understand that the deck and the other components may all be larger or smaller than described herein while maintaining their relative proportions.

Gate

Figure 2:
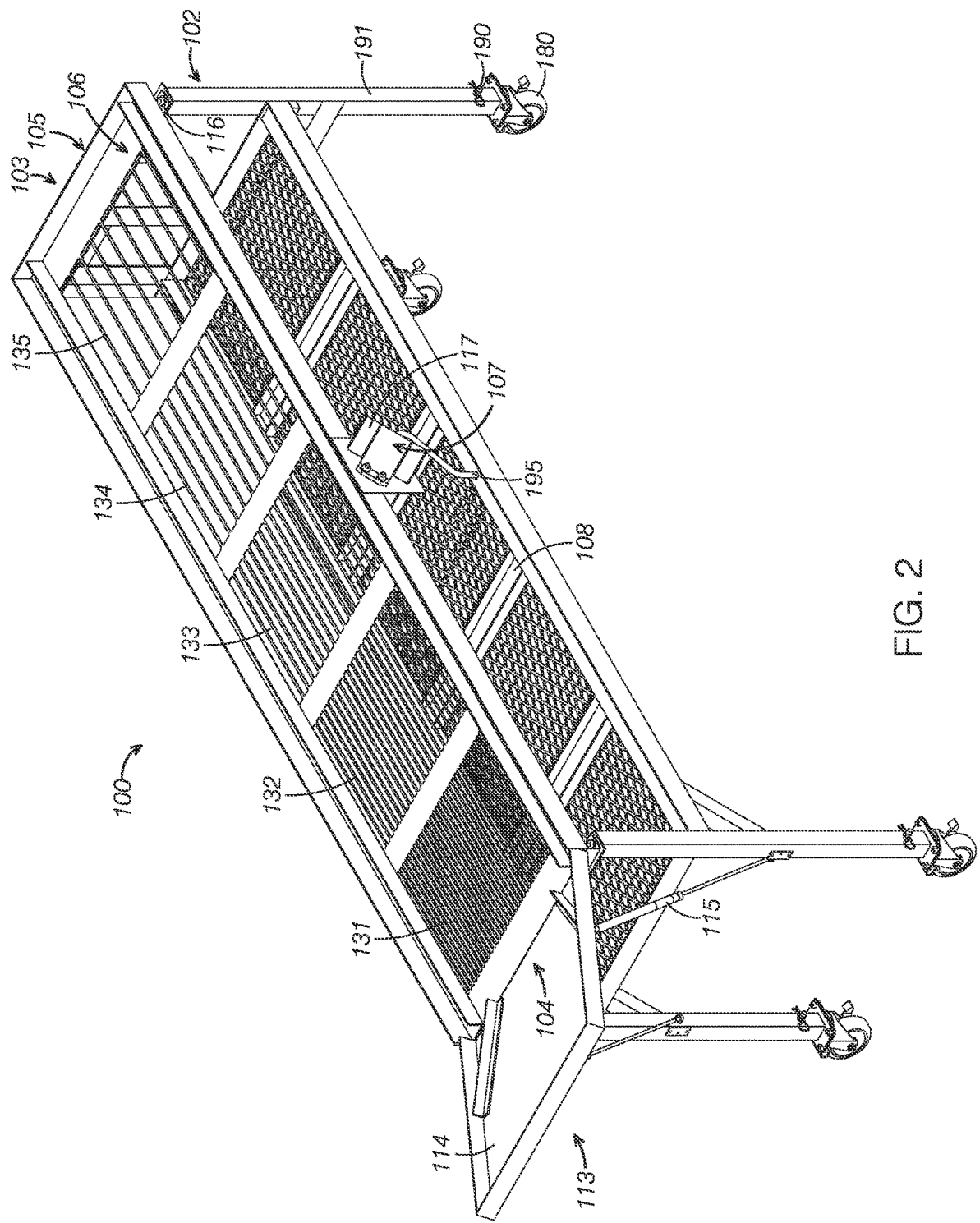
FIG. 2 is a rear-top perspective view of the table shown in FIG. 1.
Figure 5:
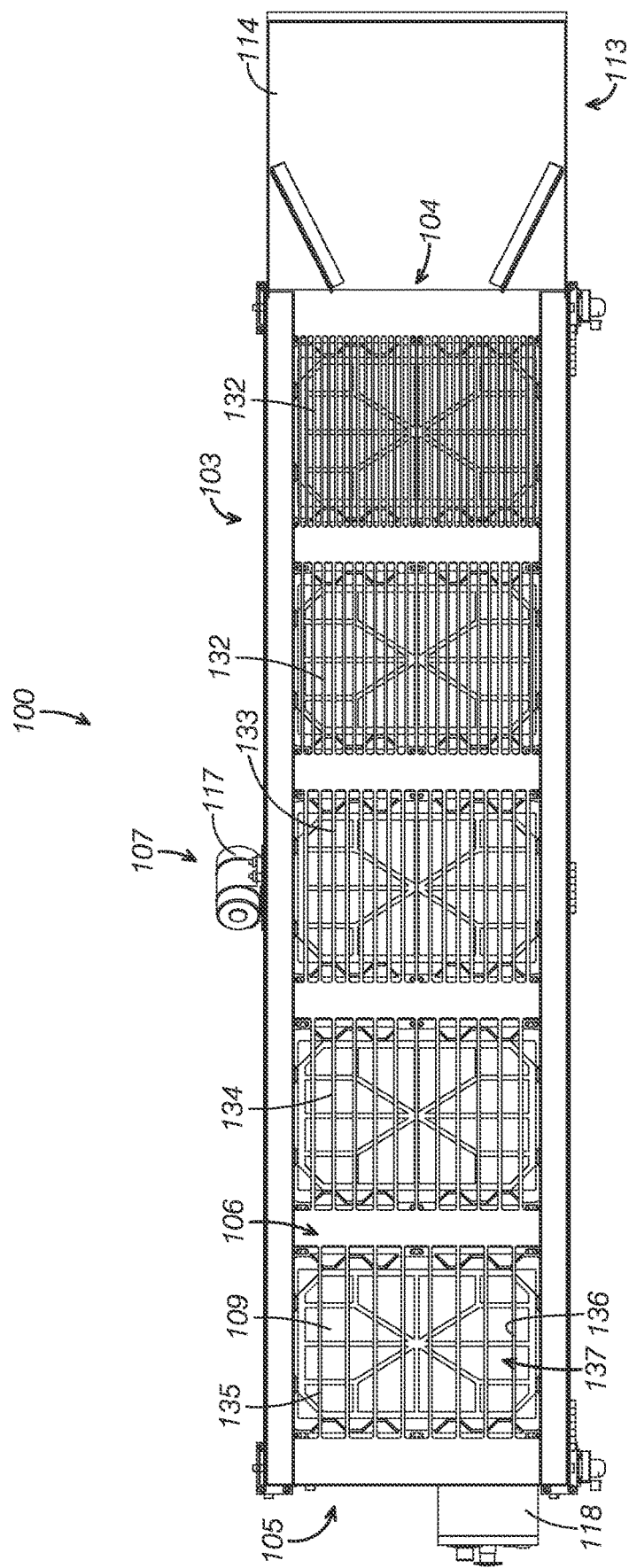
FIG. 5 is a top plan view of the table shown in FIG. 1.
Figure 6:
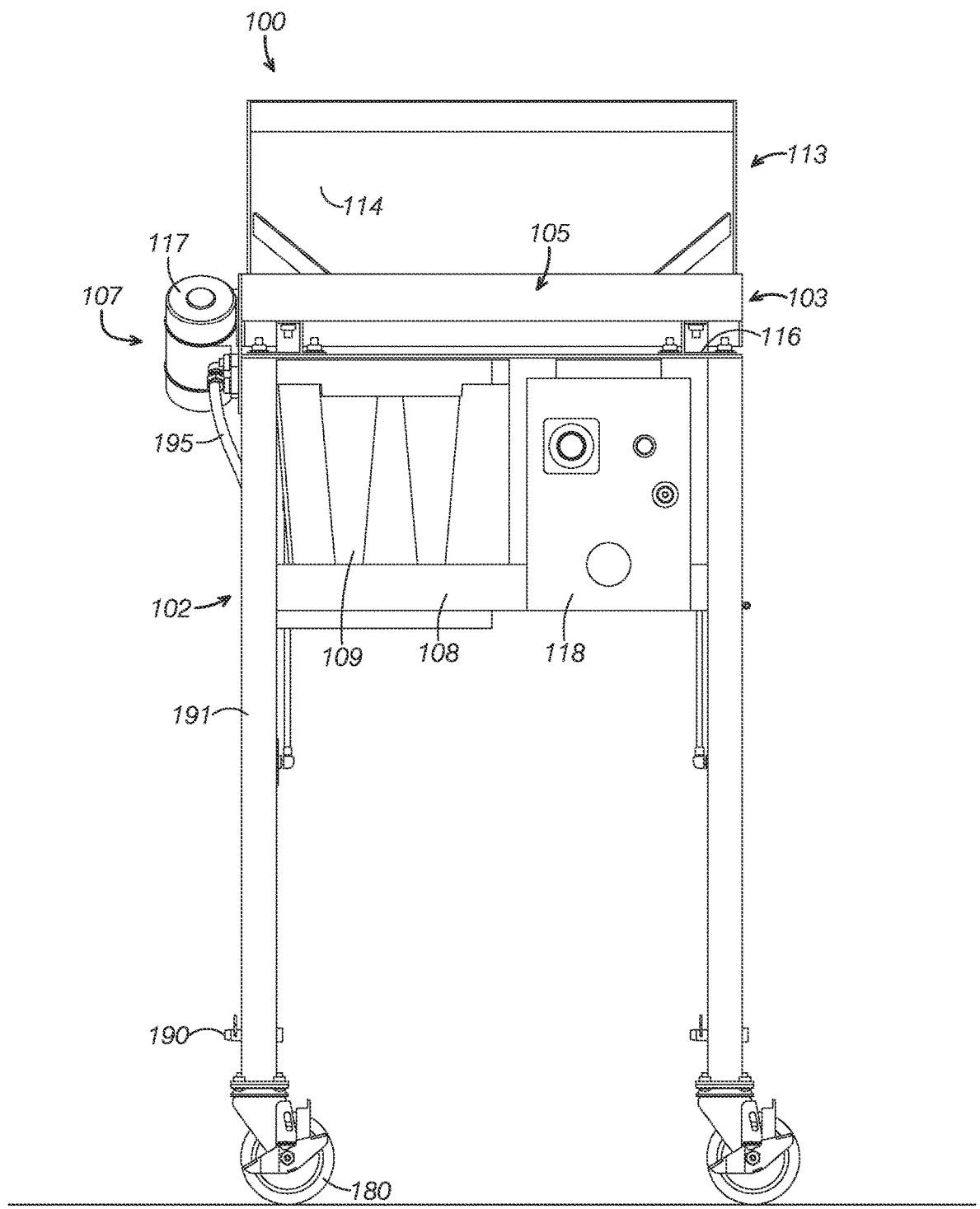
FIG. 6 is a left side elevation view of the table shown in FIG. 1.
Figure 7:
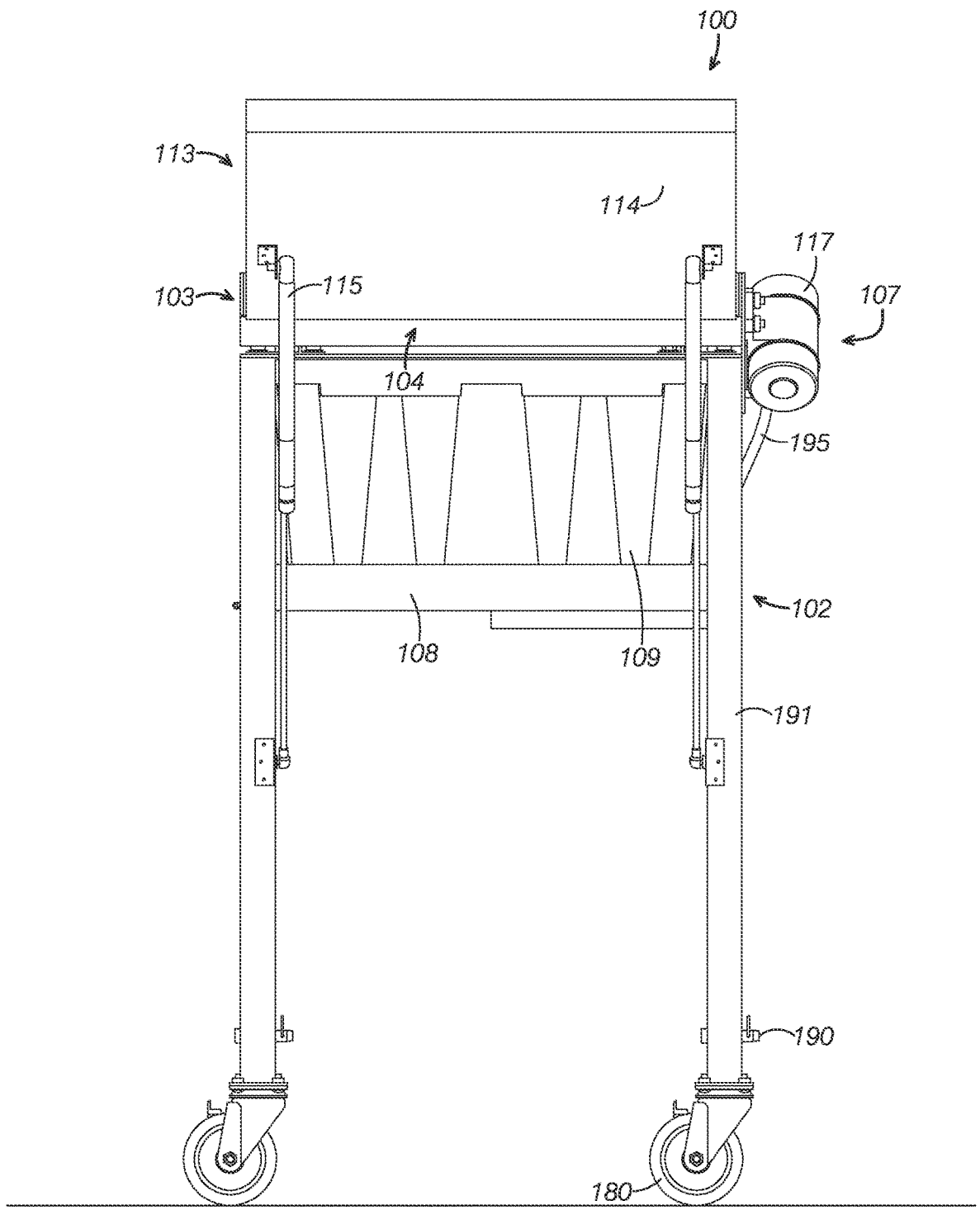
FIG. 7 is a right side elevation view of the table shown in FIG. 1.

The role of grate 106 is to sort supply of agricultural products 101 by size and shape. As shown in FIGS. 1, 2, and 5, grate 106 extends between loading end 104 and terminal end 105.

As shown in FIG. 5, grate 106 includes five grate sections, namely, a first grate section 131, a second grate section 132, a third grate section 133, a fourth grate section 134, and a fifth grate section 135. First grate section 131 is disposed proximate tray assembly 113 and loading end 104. Fifth grate section 135 is disposed proximate terminal end 105 distal tray assembly 113. The number of grates in the table may be selected to meet the needs of a given application. The reader should appreciate that the number of grates may be different in other examples than is shown in the figures. For instance, some table examples include additional or fewer grates or grate sections than described in the present example.

The reader can see in FIG. 5 that each grate section includes longitudinally extending grate members 136 laterally spaced from each other to define grate openings 137. With reference to FIGS. 1 and 5, grate 106 supports agricultural products 101 that are larger than grate openings 137 and agricultural products 101 that are smaller than grate openings 137 pass through grate 106 through grate openings 137. As shown in FIGS. 1 and 3-5, bins 109 are disposed below grate 106 on shelf 108 to collect agricultural products 101 that pass through grate openings 137.

With reference to FIG. 5, the reader can see that the grade openings 137 increase in size, that is, the spacing between the longitudinally extending grate members 136 increases, with each grate section farther away from loading end 104. As shown in FIG. 5, the size of the grate openings in first grate section 131 is narrower than the size of the grate openings in fifth grate section 135.

The variable size of the grate openings allows for sorting agricultural products 101 by size and shape as agricultural products 101 move over grate 106 from loading end 104 to terminal end 105 as deck 103 vibrates in response to vibration generator 107. In operation, the smallest agricultural products pass through the grate openings defined by first grate 131 and larger agricultural products move past first grate 131 to second grate 132. The next smallest agricultural products pass through the grate openings defined by second grate 132 and larger agricultural products move past second grate 132 and so on down the line. The largest agricultural products move to fifth grate 135 and pass through the grate openings defined in fifth grate 135 if smaller than those grate openings.

The size and shape of the grate, grate sections, and grate openings may be varied as needed for a given application. In some examples, the grate, grate sections, and/or grate openings are larger relative to the other components than depicted in the figures. In other examples, the grate, grate sections, and/or grate openings are smaller relative to the other components than depicted in the figures. Further, the reader should understand that the grate, grate sections, and/or grate openings and the other components may all be larger or smaller than described herein while maintaining their relative proportions.

In the example shown in the figures, longitudinally extending grate members 136 of grate 106 are coated with a friction reducing coating. The friction reducing coating facilitates agricultural products 101 moving across grate 106 when deck 103 vibrates. Not all examples of the grate include a friction reducing coating, however.

In the example depicted in FIGS. 1, 2, and 5, the friction reducing coating comprises a ceramic. However, the friction reducing coating may be composed of any currently known or later developed material suitable for the applications described herein for which it is used. Suitable materials include metals, polymers, ceramics, and composite materials.

The friction reducing coating may be any currently known or later developed type of friction reducing coating. The reader will appreciate that a variety of friction reducing coating types exist and could be used in place of the friction reducing coating described herein. In addition to the types of friction reducing coatings existing currently, it is contemplated that the tables described herein could incorporate new types of friction reducing coatings developed in the future.

The grate may be any currently known or later developed type of grate. The reader will appreciate that a variety of grate types exist and could be used in place of the grate shown in the figures. In addition to the types of grates existing currently, it is contemplated that the tables described herein could incorporate new types of grates developed in the future.

Longitudinally extending grate members 136 are composed of metal, but may be composed of any currently known or later developed material suitable for supporting agricultural products. Suitable materials include metals, polymers, ceramics, wood, and composite materials.

Vibration Generator

Vibration generator 107 functions to selectively vibrate deck 103. As shown in FIGS. 1, 2, and 5-7, vibration generator 107 is mounted to deck 103 and configured to vibrate deck 103. With reference to FIG. 1, vibration generator 107 vibrating deck 103 causes supply of agricultural products 101 to move across deck 103 over grate 106.

The reader can see in FIGS. 1, 2, and 5-7 that vibration generator 107 includes a motor 117 is coupled to a power supply. As shown in FIGS. 1-6, vibration generator 107 is also controllably coupled to controller 118. In the present example, the intensity and frequency of the vibrations generated by vibration generator 107 are adjustable via controller 118.

The vibration generator may be any currently known or later developed type of vibration generator. The reader will appreciate that a variety of vibration generator types exist and could be used in place of the vibration generator shown in the figures. In addition to the types of vibration generators existing currently, it is contemplated that the tables described herein could incorporate new types of vibration generators developed in the future.

The number of vibration generators in the table may be selected to meet the needs of a given application. The reader should appreciate that the number of vibration generators may be different in other examples than is shown in the figures. For instance, some table examples include additional or fewer vibration generators than described in the present example.

Controller

Controller 118 is configured to control operation of vibration generator 107. As depicted in FIGS. 1-6, controller 118 is controllably connected to vibration generator 107 via wires running through a conduit 195. However, in some examples, the controller and the vibration generator are controllably coupled wirelessly.

Controller 118 is configured to adjustably control the intensity and frequency of the vibrations generated by vibration generator 107. The intensity and frequency of the vibrations generated by vibration generator 107 may be selected to move agricultural products 101 from loading end 104 to terminal end 105 at a desired travel rate.

The desired travel rate corresponds with a desired residence time of agricultural products 101 over different grate sections of grate 106. The desired residence time may be selected to more effectively allow agricultural products 101 to be sorted by passing through grate openings 137. Additionally or alternatively, the desired travel rate and residence time may be selected to provide a desired throughput of agricultural products 101 over table 100 to meet production goals.

The controller may be any currently known or later developed type of controller. The reader will appreciate that a variety of controller types exist and could be used in place of the controller shown in the figures. In addition to the types of controllers existing currently, it is contemplated that the tables described herein could incorporate new types of controllers developed in the future.

The number of controllers in the table may be selected to meet the needs of a given application. The reader should appreciate that the number of controllers may be different in other examples than is shown in the figures. For instance, some table examples include additional or fewer controllers than described in the present example.

Shelf

Shelf 108 functions to support bins 109 in a position to collect agricultural products 101 passing through grates 106. With reference to FIGS. 1-4, 6, and 7, shelf 108 is mounted to legs 102 below deck 103.

The shelf may be any currently known or later developed type of shelf. The reader will appreciate that a variety of shelf types exist and could be used in place of the shelf shown in the figures. In addition to the types of shelves existing currently, it is contemplated that the tables described herein could incorporate new types of shelves developed in the future.

The number of shelves in the table may be selected to meet the needs of a given application. The reader should appreciate that the number of shelves may be different in other examples than is shown in the figures. For instance, some table examples include additional or fewer shelves than described in the present example.

The size and shape of the shelf may be varied as needed for a given application. In some examples, the shelf is larger relative to the other components than depicted in the figures. In other examples, the shelf is smaller relative to the other components than depicted in the figures. Further, the reader should understand that the shelf and the other components may all be larger or smaller than described herein while maintaining their relative proportions.

In the present example, the shelf is composed of metal. However, the shelf may be composed of any currently known or later developed material suitable for the applications described herein for which it is used. Suitable materials include metals, polymers, ceramics, wood, and composite materials.

Bins

Figure 3:
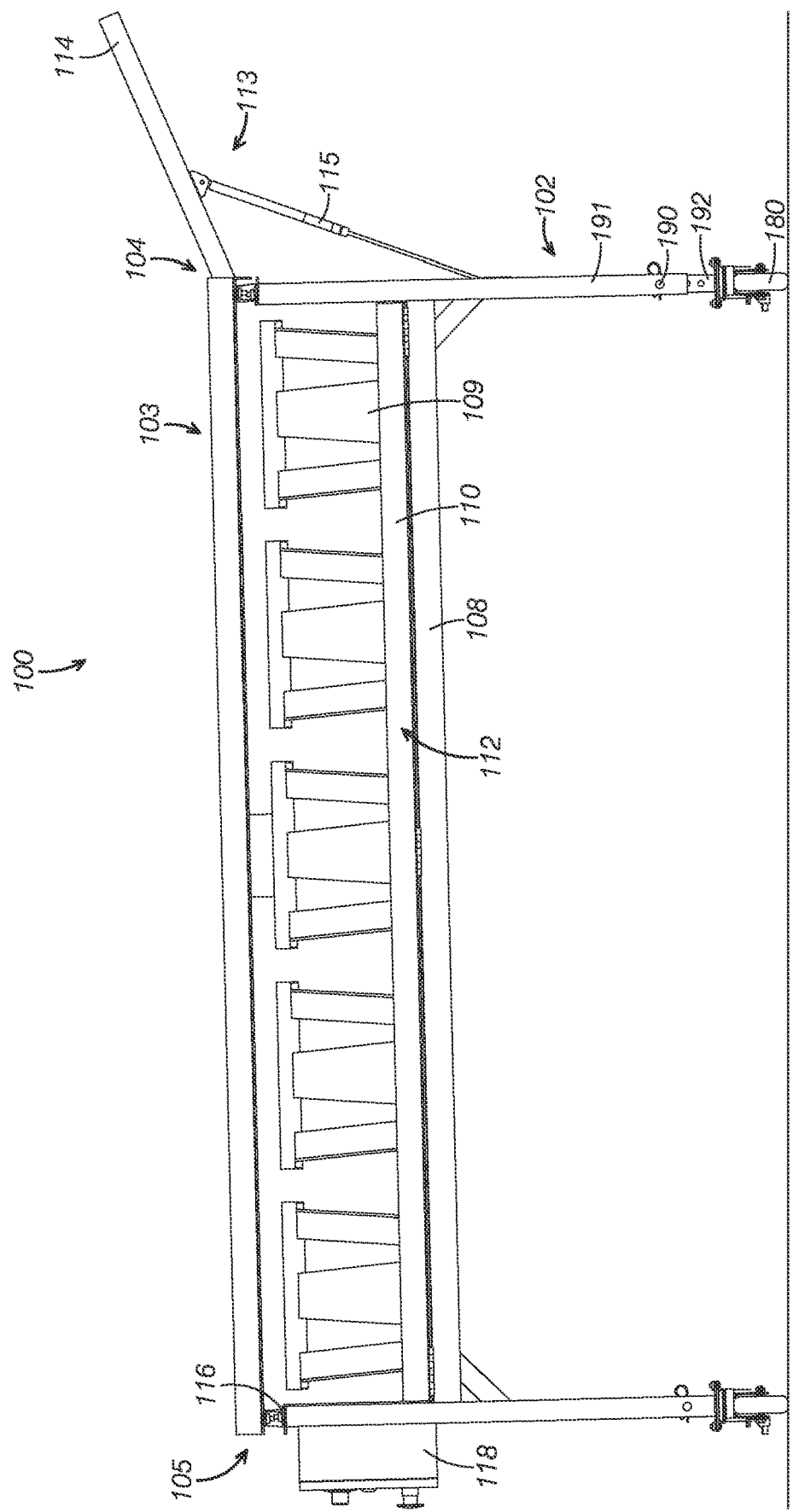
FIG. 3 is a front elevation view of the table shown in FIG. 1 with a tray assembly in a use position and a gate in a lock position.
Figure 4:
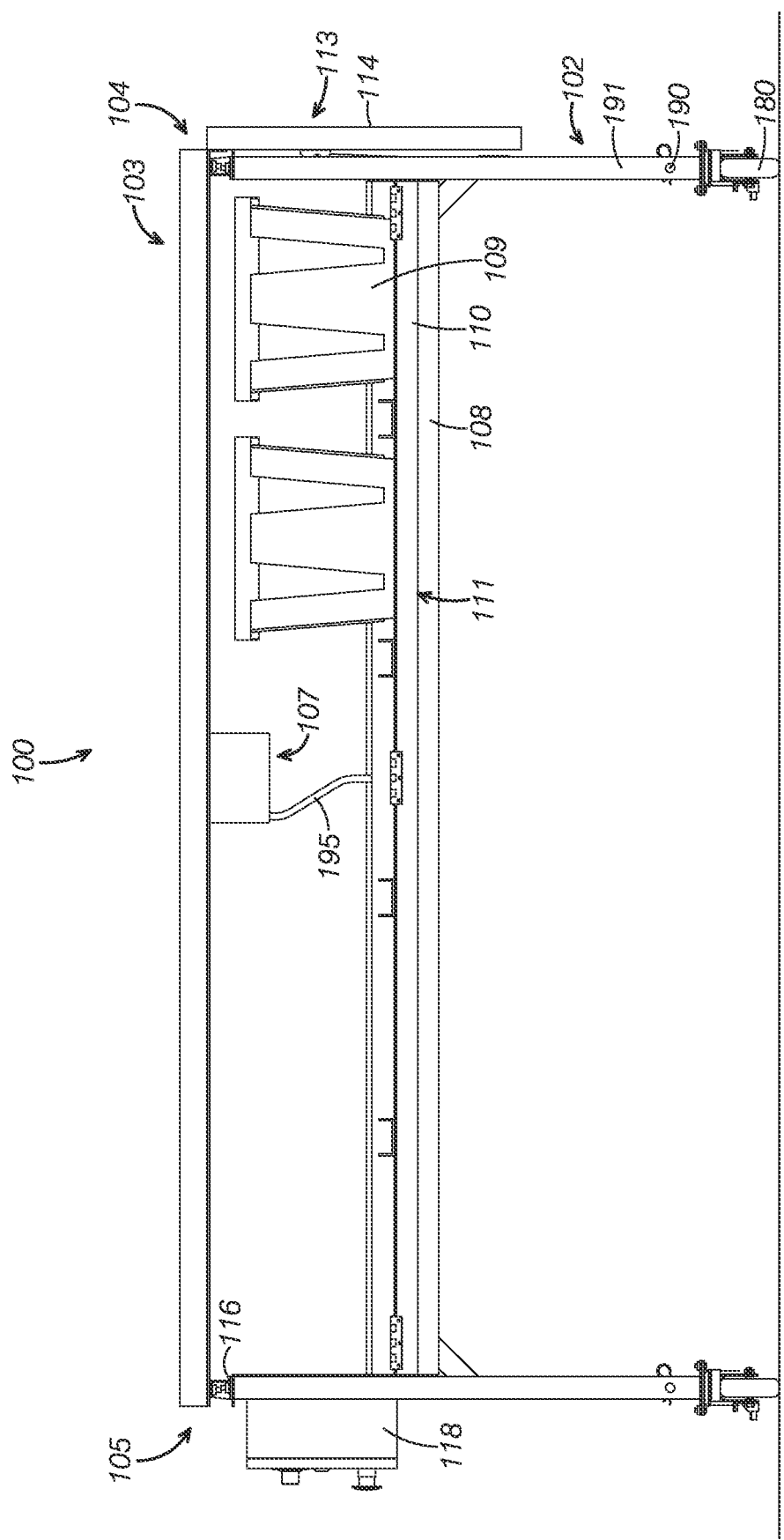
FIG. 4 is a front elevation view of the table shown in FIG. 1 with the tray assembly in a stowed position and the gate in an access position.

Bins 109 functions to collect agricultural products 101 passing through grate 106. As shown in FIGS. 1, 3, and 4, bin 109 is supported on shelf 108 below grate 106 in positions where agricultural products 101 of suitable size and shape passing through grate 106 will fall into bins 109.

The bin may be any currently known or later developed type of bin. The reader will appreciate that a variety of bin types exist and could be used in place of the bins shown in the figures. In addition to the types of bins existing currently, it is contemplated that the tables described herein could incorporate new types of bins developed in the future.

The number of bins in the table may be selected to meet the needs of a given application. The reader should appreciate that the number of bins may be different in other examples than is shown in the figures. For instance, some table examples include additional or fewer bins than described in the present example.

The size and shape of the bins may be varied as needed for a given application. In some examples, the bins are larger relative to the other components than depicted in the figures. In other examples, the bins are smaller relative to the other components than depicted in the figures. Further, the reader should understand that the bins and the other components may all be larger or smaller than described herein while maintaining their relative proportions.

Gate

Gate 110 functions to selectively retain bins 109 on shelf 108. Gate 110 further functions to selectively allow bins 109 to be placed on shelf 108 or to be removed from shelf 108.

The reader can see in FIGS. 3 and 4 that gate 110 is moveably mounted to shelf 108 proximate bins 109. In particular, as depicted in FIGS. 1, 3, and 4, gate 110 is pivotally mounted to shelf 108.

As shown in FIGS. 3 and 4, gate 110 is configured to move between an access position 111 and a lock position 112. As depicted in FIGS. 1 and 3, gate 110 abuts bin 109 in lock position 112 to restrict bins 109 from moving relative to shelf 108. With reference to FIG. 4, gate 110 is spaced from bins 109 in access position 111 to allow bins 109 to be moved relative to shelf 108.

The gate may be any currently known or later developed type of gate. The reader will appreciate that a variety of gate types exist and could be used in place of the gate shown in the figures. In addition to the types of gates existing currently, it is contemplated that the tables described herein could incorporate new types of gate developed in the future.

The number of gates in the table may be selected to meet the needs of a given application. The reader should appreciate that the number of gates may be different in other examples than is shown in the figures. For instance, some table examples include additional or fewer gates than described in the present example.

The size and shape of the gate may be varied as needed for a given application. In some examples, the gate is larger relative to the other components than depicted in the figures. In other examples, the gate is smaller relative to the other components than depicted in the figures. Further, the reader should understand that the gate and the other components may all be larger or smaller than described herein while maintaining their relative proportions.

Tray Assembly

Tray assembly 113 functions to receive supply of agricultural products 101 and to direct agricultural products 101 onto deck 103. As depicted in FIGS. 1-7, tray assembly 113 is mounted to loading end 104 of deck 103. In particular, with reference to FIGS. 1-5, tray assembly 113 is pivotally mounted to deck 103.

The reader can see in FIGS. 1-3, and 7 that tray assembly 113 includes a tray 114 and a strut 115. As shown in FIGS. 1-3, 6, and 7, tray assembly 113 is configured to maintain tray 114 at a selected downward slope relative to deck 103.

The downward slope facilitates agricultural products 101 moving due to the force of gravity onto deck 103. The particular downward slope may be varied to cause agricultural products 101 to slide down tray 114 at a desired rate. In some examples, the tray is maintained substantially horizontal rather than at a downward angle.

Strut

The role of strut 115 is to support tray 114. In the example shown in FIGS. 1-3, and 7, strut 115 supports tray 114 at the selected downward slope. As depicted in FIGS. 1-3, and 7, strut 115 extends from legs 102 to tray 114.

With reference to FIGS. 1-3, and 7, strut 115 is a gas strut. However, the strut may be any currently known or later developed type of strut. The reader will appreciate that a variety of strut types exist and could be used in place of the strut shown in the figures. In addition to the types of struts existing currently, it is contemplated that the tables described herein could incorporate new types of struts developed in the future.

The number of struts in the table may be selected to meet the needs of a given application. The reader should appreciate that the number of struts may be different in other examples than is shown in the figures. For instance, some table examples include additional or fewer struts than described in the present example.

The size and shape of the strut may be varied as needed for a given application. In some examples, the strut is larger relative to the other components than depicted in the figures. In other examples, the strut is smaller relative to the other components than depicted in the figures. Further, the reader should understand that the strut and the other components may all be larger or smaller than described herein while maintaining their relative proportions.

Vibration Dampeners

Vibration dampeners 116 function isolate legs 102, shelf 108, bins 109 and other components of table 100 from vibrations in deck 103 generated by vibration generator 107. As shown in FIGS. 1-4, vibration dampeners 116 are mounted between deck 103 and legs 102.

In the present example, vibration dampeners 116 include a layer of shock absorbing material disposed between fasteners fastening deck 103 to legs 102. However, the vibration dampeners may be any currently known or later developed type of vibration dampener. The reader will appreciate that a variety of vibration dampener types exist and could be used in place of the vibration dampeners shown in the figures. In addition to the types of vibration dampeners existing currently, it is contemplated that the tables described herein could incorporate new types of vibration dampeners developed in the future.

In the present example, vibration dampeners 116 are composed of neoprene. However, the vibration dampeners may be composed of any currently known or later developed material suitable for the applications described herein for which it is used. Suitable materials include polymers, wood, and composite materials.

The number of vibration dampeners in the table may be selected to meet the needs of a given application. The reader should appreciate that the number of vibration dampeners may be different in other examples than is shown in the figures. For instance, some table examples include additional or fewer vibration dampeners than described in the present example.

The size and shape of the vibration dampeners may be varied as needed for a given application. In some examples, the vibration dampers are larger relative to the other components than depicted in the figures. In other examples, the vibration dampeners are smaller relative to the other components than depicted in the figures. Further, the reader should understand that the vibration dampeners and the other components may all be larger or smaller than described herein while maintaining their relative proportions.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A table for sorting a supply of agricultural products, comprising: legs;
    a deck supported on the legs, the deck including: a loading end;
    a terminal end opposite the loading end; and
    a grate extending between the loading end and the terminal end and defining grate openings;
    a vibration generator mounted to the deck and configured to vibrate the deck;
    wherein the grate supports agricultural products within the supply that are larger than the grate openings and agricultural products within the supply that are smaller than the grate openings pass through the grate through the grate openings;
    wherein the vibration generator vibrating the deck causes the supply of agricultural products to move across the deck over the grate;
    further comprising a shelf mounted to the legs below the deck; further comprising a bin supported on the shelf below the grate to collect agricultural products passing through the grate;
    further comprising a gate moveably mounted to the shelf proximate the bin; wherein:
    the gate is configured to move between an access position and a lock position;
    the gate is spaced from the bin in the access position to allow the bin to be moved relative to the shelf; and
    the gate abuts the bin in the lock position to restrict the bin from moving relative to the shelf;
    wherein the gate is pivotally mounted to the shelf.

2. The table of claim 1, further comprising a tray assembly mounted to the loading end of the deck.

3. The table of claim 2, wherein the tray assembly is pivotally mounted to the deck.

4. The table of claim 3, wherein the tray assembly is configured to maintain a selected downward slope relative to the deck.

5. The table of claim 4, wherein the tray assembly includes: a tray; and
    a strut extending from the legs to the tray to support the tray at the selected downward slope.

6. The table of claim 5, where the strut is a gas strut.

7. The table of claim 1, further comprising vibration dampeners mounted between the deck and the legs to isolate the legs from vibrations in the deck.

8. The table of claim 7, wherein the vibration dampeners are comprised of neoprene.

9. The table of claim 1, wherein the vibration generator includes a motor.

10. The table of claim 1, wherein the vibration generator is adjustable to control the intensity of the vibrations.

11. The table of claim 1, further comprising a controller operatively connected to the vibration generator and configured to control operation of the vibration generator.

12. The table of claim 1, wherein the legs include casters.

13. The table of claim 1, wherein one or more of the legs is height adjustable.

14. The table of claim 1, wherein the grate is coated with a friction reducing coating to facilitate the supply of agricultural products moving across the grate when the deck vibrates.

15. The table of claim 14, wherein the friction reducing coating comprises a ceramic.

* * * * *